United States Patent
Lang et al.

(10) Patent No.: US 10,401,583 B2
(45) Date of Patent: Sep. 3, 2019

(54) OPTICAL CABLE FOR TERRESTRIAL NETWORKS

(71) Applicant: PRYSMIAN S.P.A., Milan (IT)

(72) Inventors: Ian Dewi Lang, Milan (IT); Paul John Roberts, Milan (IT)

(73) Assignee: PRYSMIAN S.P.A., Milan (IT)

( * ) Notice: Subject to any disclaimer, the term of this patent is extended or adjusted under 35 U.S.C. 154(b) by 0 days.

(21) Appl. No.: 15/537,761

(22) PCT Filed: Dec. 23, 2014

(86) PCT No.: PCT/EP2014/079232
§ 371 (c)(1),
(2) Date: Jun. 19, 2017

(87) PCT Pub. No.: WO2016/102017
PCT Pub. Date: Jun. 30, 2016

(65) Prior Publication Data
US 2018/0011273 A1    Jan. 11, 2018

(51) Int. Cl.
*G02B 6/44* (2006.01)

(52) U.S. Cl.
CPC ........... *G02B 6/441* (2013.01); *G02B 6/4413* (2013.01); *G02B 6/4429* (2013.01); *G02B 6/4433* (2013.01); *G02B 6/4482* (2013.01); *G02B 6/4486* (2013.01)

(58) Field of Classification Search
None
See application file for complete search history.

(56) References Cited

U.S. PATENT DOCUMENTS

| | | | | | |
|---|---|---|---|---|---|
| 5,343,549 | A | * | 8/1994 | Nave | G02B 6/4434 385/103 |
| 5,345,526 | A | * | 9/1994 | Blew | G02B 6/4415 385/100 |
| 5,930,431 | A | * | 7/1999 | Lail | G02B 6/4494 385/100 |

(Continued)

FOREIGN PATENT DOCUMENTS

EP    2 725 399 A1    4/2014

OTHER PUBLICATIONS

International Search Report form the European Patent Office in corresponding International Application No. PCT/EP2014/079232 dated Sep. 11, 2015.

(Continued)

*Primary Examiner* — Michael Stahl
(74) *Attorney, Agent, or Firm* — Finnegan, Henderson, Farabow, Garrett & Dunner, L.L.P.

(57) ABSTRACT

An optical cable includes an optical module which includes first optical fibers and a first retaining element arranged about the first optical fibers. The module also includes second optical fibers arranged about the first retaining element, the second optical fibers being arranged on at least one circumference concentric with the first retaining element. The module also includes a second retaining element arranged about the second optical fibers, which is also substantially coaxial with the first retaining element. This optical module with coaxial retaining elements and fibers has a particularly high fiber density, while preserving the possibility to uniquely identify all the fibers.

13 Claims, 3 Drawing Sheets

(56) References Cited

U.S. PATENT DOCUMENTS

| | | | |
|---|---|---|---|
| 6,178,278 B1 | 1/2001 | Keller et al. | |
| 6,321,012 B1 | 11/2001 | Shen | |
| 6,389,204 B1* | 5/2002 | Hurley | G02B 6/4432 |
| | | | 385/102 |
| 6,424,769 B1 | 7/2002 | Olsson et al. | |
| 2002/0181906 A1* | 12/2002 | Hurley | G02B 6/4432 |
| | | | 385/102 |
| 2005/0213901 A1* | 9/2005 | Cook | G02B 6/4482 |
| | | | 385/102 |
| 2006/0280413 A1 | 12/2006 | Paschal et al. | |
| 2010/0239216 A1 | 9/2010 | Paschal et al. | |
| 2014/0093216 A1 | 4/2014 | Rhyne et al. | |
| 2014/0112630 A1 | 4/2014 | Hennink et al. | |
| 2014/0226940 A1* | 8/2014 | Keller | G02B 6/4429 |
| | | | 385/111 |

OTHER PUBLICATIONS

Written Opinion of the International Searching Authority from the European Patent Office in corresponding International Application No. PCT/EP2014/079232, dated Sep. 11, 2015.

* cited by examiner

OPTICAL CABLE FOR TERRESTRIAL NETWORKS

CROSS REFERENCE TO RELATED APPLICATION

This application is a national phase application based on PCT/EP2014/079232, filed Dec. 23, 2014, the content of which is incorporated herein by reference.

TECHNICAL FIELD

The present invention relates to the field of optical cables. More particularly, the present invention relates to an optical cable comprising an optical module suitable for terrestrial networks, in particular—but not exclusively—optical access networks such as FTTH (Fiber To The Home) networks and FTTP (Fiber To The Premises) networks.

BACKGROUND ART

As known, an optical cable typically comprises an optical core and an external sheath enclosing the optical core. The external sheath is typically made of a polymeric material and has the primary function of protecting the optical core from the mechanical stresses.

The optical core of the cable typically comprises one or more optical modules, the term "optical module" indicating a fiber bundle—comprising one or more optical fibers—and a retaining element (e.g. a buffer tube or a tape) surrounding the optical fibers. The retaining element carries out the function of retaining the optical fibers and, optionally, protecting them against mechanical stresses.

An optical fiber is typically constituted by a glass core, a glass cladding and a single or dual polymeric coating layer.

The optical fibers may be arranged in various ways within the cable.

For instance, in the so-called "central loose tube cables" (briefly, CLT cables) a single optical unit comprising optical fibers loosely arranged within a buffer tube is enclosed by the external sheath.

U.S. Pat. No. 6,178,278 describes a CLT cable, wherein the buffer tube is a dry-loose tube and has a fiberglass yarn matrix arranged about it. An external jacket is arranged about the fiberglass yarn matrix. Ripcords are also provided between the dry-loose tube and the jacket.

The so-called "multi loose tube cables" (briefly, MLT cables) typically comprise multiple optical modules (e.g. 3, 4 or 6 optical modules) stranded about a central strength member. A binder may also be provided around the optical modules for retaining them. An external sheath surrounds all the optical modules.

U.S. Pat. No. 6,424,769 describes a MLT cable comprising multiple optical modules arranged within an external sheath. According to an embodiment, a first array of six optical modules is arranged around a central core, while a second array of twelve optical modules is arranged around the first array of six optical modules, so that the first and second array of optical modules are coaxial.

In optical cables, the identification of each single optical fiber may be determined by a color coding. The international standard ANSI/EIA/TIA-598 "Optical Fiber Color Coding" in particular defines twelve individual colors plus twelve individual colors with tracers (e.g. ring marks every 100 mm along the fibers). Hence, in order to allow individual identification of each single fiber comprised in an optical module, the optical module may comprise at most 12 optical fibers (if no tracers are used) or 24 optical fibers (if tracers are used).

In order to increase the fiber count of an optical module (and hence of the whole cable) beyond such limits, it is known grouping the optical fibers in several wrapped bundles.

U.S. Pat. No. 6,321,012 describes an optical cable wherein the optical fibers are divided in groups (e.g. four groups), each group being wrapped by a water-swellable material tape having a unique color. Each optical fiber is identified by a unique combination of tape color and fiber color.

SUMMARY OF THE INVENTION

The inventors have noticed that, though the technique of U.S. Pat. No. 6,321,012 allows increasing the number of uniquely identifiable fibers, it exhibits some drawbacks.

First of all, bundled optical fibers exhibit a quite low optical fiber density. This is due to the fact that a significantly large free space (namely, a space not filled with fibers) is unavoidably left about the fiber groups within the retaining element. This also limits the overall fiber density of cables comprising this type of arrangements.

Besides, bundled optical fibers are suitable for point-to-point communications, where all the optical fibers are terminated at a same location. However, this cable construction is not suitable for mid-span access, where only few designated fibers shall be extracted from the retaining element for being locally terminated. Handling the fibers is very critical, and the risk of damaging fibers which shall not be terminated (and which are carrying user traffic) is very high.

Moreover, bundled optical fibers are very complex to be manufactured. The required equipment includes a multitude of apparatus. Furthermore, the fiber overfeed (excess fiber length) is very difficult to be controlled. Within a group of wrapped fibers bundle, the excess fiber length is indeed usually normalized by winding the fiber about a capstan before wrapping. For manufacturing a cable with high fiber count, each group of bundled fibers requires a bank of pay-off apparatus, which all need to control the tension of the fiber. This control shall be maintained across the various banks. Moreover, the bundled fibers are directly bound by binders, which are fed into a tube, which may be filled with thixotropic gel for longitudinally blocking water propagation. The action of the wrapping represents a product manufacturing risk, in that the wrapping can break, add pressure or drag fibers through the gel applicator.

Among others, the Applicant has tackled the problem of providing an optical cable for terrestrial networks (in particular, but not exclusively, FTTH or FTTP networks) comprising an optical module which allows providing cables with high fiber density, while preserving the possibility to uniquely identify all the fibers of the cable, and which at the same time allows easy and safe mid-span access to the fibers and which may be manufactured in an easy and non-expensive way.

In the above, the Applicant found an optic al cable comprising an optical module in turn comprising a first group of optical fibers arranged within an inner retaining element and a second group of optical fibers arranged externally to the inner retaining element in one or more circumferences concentric with the inner retaining element. The optical module also comprises an outer retaining element arranged about the second group of optical fibers, the second retaining element being substantially coaxial with the first retaining element.

It has been found that this optical module arrangement has a reduced diameter, in comparison to known optical modules comprising a same number of uniquely identifiable optical fibers, providing cables with an increased fiber density.

Mid-span access to fibers is much easier than in wrapped fiber optical modules. The fibers arranged between the coaxial retaining elements may be indeed easily accessed by simply cutting the outer retaining element. The fibers arranged within the inner retaining element are also easily accessible, by moving aside the fibers arranged between the two retaining elements (which may be easily done, especially if these fibers are arranged side by side on a single circumference, with no reciprocal overlapping) and removing the inner retaining element.

The optical module of the cable of the invention may also be manufactured in an easy and economically effective way, possibly by adapting conventional cabling equipment.

In one aspect, the present invention relates to an optical cable comprising an optical module, the optical module comprising:
 a first group of optical fibers;
 a first retaining element arranged about the first group of optical fibers;
 a second group of optical fibers arranged about the first retaining element, the second group of optical fibers being arranged along a circumference concentric with the first retaining element; and
 a second retaining element arranged about the second group of optical fibers, the second retaining element being substantially coaxial with the first retaining element.

Preferably, the first retaining element and the second retaining element are two coaxial tubes.

Preferably, the two coaxial tubes are made of a same polymeric material. Alternatively, the two coaxial tubes are made of polymeric materials having different rigidity, preferably the outer tube being less rigid than the inner tube when easy access to the inner tube is sought.

Alternatively, at least one of the first retaining element and the second retaining element comprises a tape or yarns with longitudinal or helical lay.

Preferably, the first retaining element is a longitudinal or helical tape or yarns and the second retaining element is a coaxial tube.

Preferably, the first retaining element and the second retaining element have different colors.

Preferably, the first group of optical fibers is a bundle of fibers loosely arranged within the first retaining element.

Preferably, the second group of optical fibers is an array of optical fibers loosely arranged within an annular space defined between the first retaining element and the second retaining element.

Preferably, at least one of the first group of optical fibers and the second group of optical fibers comprises a number of fibers such that each one of the at least one of the first group of optical fibers and the second group of optical fibers is uniquely identifiable based on its color.

Preferably, the second group of optical fibers is an array of optical fibers arranged side by side substantially on a single layer, with no reciprocal overlapping.

Preferably, at least some of the free volume within the first retaining element and/or within the second retaining element is filled with a filling compound.

In another aspect, the present invention relates to a process for manufacturing an optical module of an optical cable, the process comprising:
 advancing a first group of optical fibers;
 laying a first retaining element about the first group of optical fibers (13);
 laying a second group of optical fibers about the first retaining element; and
 laying a second retaining element about the second group of optical fibers, the second retaining element being substantially coaxial with the first retaining element.

Preferably, the second group of optical fibers is laid in a single layer, coaxial with the first retaining element.

Preferably, laying at least one of the first and second retaining element is made by extrusion.

BRIEF DESCRIPTION OF THE DRAWINGS

The present invention will become fully clear by reading the following detailed description, to be read by referring to the accompanying drawings, wherein.

DETAILED DESCRIPTION OF PREFERRED EMBODIMENTS OF THE INVENTION

For the purpose of the present description and of the appended claims, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

Figure 1:
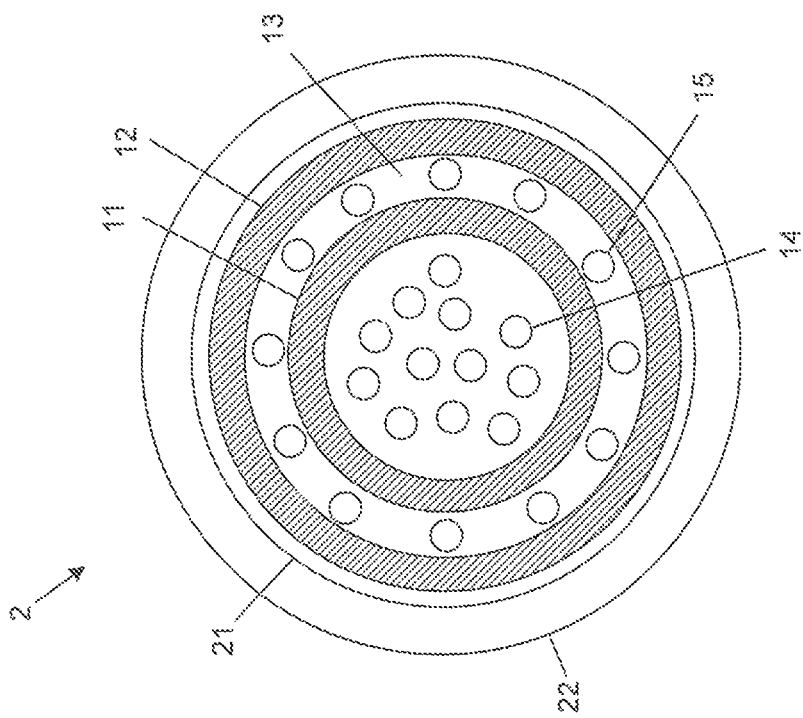
FIG. 1 schematically shows an optical module according to an embodiment of the present invention.

FIG. 1 shows an optical module 1 according to an embodiment of the present invention.

The optical module 1 comprises a first (inner) retaining element 11 and a second (outer) retaining element 12. The outer retaining element 12 is arranged externally to the inner retaining element 11 in a coaxial way. This way, the retaining elements 11, 12 form an annular space 13 between them.

The retaining elements 11, 12 are preferably in the form of coaxial tubes. More preferably, the retaining elements 11, 12 are in the form of polymeric tubes. Exemplary polymeric materials which may be employed are: polybutylene terephthalate (PBT), high-density polyethylene (PEI-ID), polypropylene (PP) acrylonitrile butadiene styrene (ABS), polyamide (PA), and UV cured acrylates. A combination of polymers may also be used, for instance PBT co-extruded with polycarbonate (PC). The inventors have made positive tests using Ultradur® B6550L (PBT) by BASF (Germany) for both the innerretaining element 11 and the outer retaining element 12. Alternatively, SPESIN® KP270 by Kolon (South Korea) or Vestodur® V3013 by Evonik (Germany) may be used.

The above listed polymeric materials provide substantially rigid tubes (i.e. having a relatively high elastic module). Optical modules whose retaining elements are in the form of rigid tubes may be used e.g. in CLT cables and MLT cables, as it will be described in detail herein after.

According to alternative embodiments, the retaining elements 11, 12 are in the form of non-rigid tubes (i.e. having a relatively low elastic module). Exemplary non-rigid polymeric materials that may be used at this purpose are thermoplastic elastomers (TPE), for example Santoprene™ (namely, a mixture of an in-situ cross-linking of EPDM rubber and polypropylene), amorphous polyvinyl chloride (PVC), polyvinyledene difluoride (PVDF), and ethylene-vinyl acetate (EVA).

Preferably, the retaining elements 11, 12 are made of a same polymeric material. Alternatively, the retaining elements 11, 12 may be made of different materials, having different rigidity, or other properties as required by the specific intended use of the cable.

For example, both the retaining elements 11, 12 may be made of PBT. According to another example, the outer retaining element 12 is made of Santoprene™ (which is easier to strip), whereas the inner retaining element 11 is made of PBT. Profitably, the retaining elements 11, 12 have different colors. This eases the identification of each single optical fiber of the optical module 1.

According to a variant, the inner retaining element 11 and/or the outer retaining element 12 is essentially made of a longitudinal or helical tape or yarns. This may be a cheaper alternative to buffer tubes, which may be preferred depending on the fiber count (in particular, for lower fiber counts) and equipment available for the manufacturing of the optical module 1. Preferably, the inner retaining element 11 is a longitudinal or helical tape or yarn and the outer retaining element 12 is a tube.

The optical module 1 further comprises a first group of optical fibers 14 arranged within the inner retaining element 11. The optical fibers 14 are preferably loosely arranged within the inner retaining element 11. The optical fibers 14 are preferably arranged within the inner retaining element 11 according to a helical or an S-Z (periodically reversed helix) arrangement.

The number of optical fibers 14 arranged within the inner retaining element 11 is preferably selected so that each fiber 14 is uniquely identifiable. For instance, if the fiber identification is based on the color codes defined by the above mentioned international standard ANSI/EIA/TIA-598 "Optical Fiber Color Coding", the optical fibers 14 are at most twelve (if no tracers are used) or twenty-four (if tracers are used).

The optical module 1 further comprises a second group of optical fibers 15 arranged within annular space 13 formed between the inner retaining element 11 and the outer retaining element 12. The optical fibers 15 are preferably loosely arranged within the annular space 13. The optical fibers 15 are preferably arranged within the annular space 13 according to an S-Z arrangement. The lay length of the S-Z arrangement is preferably comprised between 90 mm and 900 mm. The Applicant has made positive tests using an S-Z arrangement with a lay length of 500 mm (preferably, the reversal point is every ¾ of a turn) using both Draka BendBright fibers (compliant with ITU-T Recommendation G.657.A1) and Draka BendBright-XS fibers (compliant with ITU-T Recommendation G.657.A2).

The fibers 15 are preferably arranged substantially on one or more circumferences concentric with the retaining elements 11, 12. In FIG. 1, by way of example, the fibers 15 are arranged on a single circumference C concentric with the retaining elements 11, 12. This way, the fibers 15 form a single layer of fibers within the annular space 13. The fibers 15 are preferably arranged side by side, with no reciprocal overlapping. This minimizes the signal attenuation occurring in case the optical module 1 is subjected to radial load, and maximizes accessibility of the inner retaining element 11 and the fibers 14 housed therein.

The number of optical fibers 15 arranged within the annular space 13 is preferably selected so that each fiber 15 is uniquely identifiable. For instance, if the fiber identification is based on the color codes defined by the above mentioned international standard ANSI/EIA/TIA-598 "Optical Fiber Color Coding", the optical fibers 15 are at most twelve (if no tracers are used) or twenty-four (if tracers are used).

By way of example, the optical module 1 shown in FIG. 1 comprises twelve fibers 14 arranged within the inner retaining element 1 and twelve optical fibers 15 arranged within the annular space 13. The fiber count of the optical element 1 is accordingly 24.

In another example, for an optical module 1 of 48 fibers and with the external diameter of each single optical fiber of 200 microns, the inner retaining element 11 may have an outside diameter of 1.9-2.0 mm and an inside diameter of 1.5-1.6 mm, while the outer retaining element 12 may have an outside diameter of 3.1 mm (which corresponds to the outside diameter of the optical module 1) and an inside diameter of 2.7 mm.

More generally, with a fiber count of 48, with optical fiber diameter ranging from 200 to 250 microns, the inner retaining element 11 preferably has an outside diameter comprised between 1.0 mm and 2.5 mm, the outer retaining element 12 has an outside diameter (which corresponds to the outside diameter of the whole optical module 1) comprised between 1.7 mm and 3.5 mm, and the thickness of both elements 11, 12 is preferably comprised between 0.1 mm and 0.4 mm.

Preferably, the interstitial spaces between the optical fibers 14 within the inner retaining element 11 are filled with a filling compound, for instance a water-blocking material (e.g. a synthetic thixotropic gel). Preferably, also the interstitial spaces between the optical fibers 15 within the annular space 13 are filled with a filling compound, for instance a water-blocking material (e.g. a synthetic thixotropic gel). The water-blocking material, besides carrying out a longitudinally water blocking function, also advantageously buffers the optical fibers 14, 15 from transient loads. The inventors have made positive tests using the filling compound 400N by Unigel (UK). Alternatively, the filling compound K880 by Info-Gel, LLC (North Carolina, USA) may be used. Alternatively to a thixotropic gel, a dry lubricant or a dry-water-blocking material may be used within the inner retaining element 11 and/or within the annular space 13. Alternatively, the interstitial spaces between the optical fibers within the inner retaining element 11 and/or the outer retaining element 12 may be filled with yarns (with possible adding of water blocking material), in order to make the whole optical module a cheaper alternative to the solution having filling compounds.

Though the optical module 1 shown in FIG. 1 comprises two coaxial retaining elements only, this is not limiting. An optical module according to embodiments of the present invention may indeed comprise more than two coaxial retaining elements. In such embodiments, each pair of adjacent retaining elements forms a respective annular space. A group of uniquely identifiable optical fibers is preferably arranged within the inner retaining element, as described above, while a respective further group of uniquely identifiable optical fibers is preferably arranged within the annular space formed by each pair of adjacent retaining elements.

The optical module 1 advantageously has a reduced diameter, in comparison to known optical modules (in particular, bundled fiber optical modules) having a same fiber count.

Indeed, as mentioned above, in order to allow each optical fiber of an optical module to be individually identifiable, a known optical module may comprise at most 24 optical fibers (assuming that tracers are used). If a bundled fiber design is used, a fiber count of 48 may be achieved within the optical module, by providing two groups of bundled fibers, each group comprising 24 fibers. Within the retaining element of the optical module, the fiber groups are typically arranged side by side. The external diameter D of the optical module is then quite large, since the optical module exhibits a relatively large free space (namely, a space not filled with fibers) about the bundled fiber groups arranged side by side.

The coaxial structure of the present invention allows reducing the diameter D of the optical module. According to embodiments of the present invention, a fiber count of 48 is indeed achieved with two coaxial retaining elements, 24 uniquely identifiable fibers arranged within the inner retaining element and 24 uniquely identifiable fibers arranged within the annular space enclosed between the two retaining elements. This arrangement is much more compact than the bundled fiber design. Assuming that the retaining elements of the optical module have a thickness of 200 microns and that each single optical fiber has an external diameter of 250 microns, the inventors have estimated that the external diameter of the optical module may be reduced to 0.86 D (D being the external diameter of a bundled fiber optical module having the same fiber count).

The denser fiber packaging of the optical fibers within the optical module then advantageously results in optical cables with a reduced diameter, which is a particularly desirable requirement especially in FTTX applications.

The cable diameter reduction depends on the cable geometry and the fiber count.

For instance, according to a known optical cable, a fiber count of 48 may be achieved using 4 optical modules, each module including 12 optical fibers. If the external diameter of each known optical module is 1.9 mm, the diameter of the optical core is about 4.3 mm and the cable diameter is about 6.3 mm. Instead, according to the invention, a same fiber count of 48 may be instead achieved using a single optical module similar to module 1, including 48 optical fibers. If the external diameter of this unique optical module is 3.1 mm, the diameter of the optical core is 3.1 mm too, and the cable diameter is 5.1 mm. Hence, the cable diameter is reduced by 19.3%.

In a known optical cable a fiber count of 96 may be achieved by using 8 optical modules, each module including 12 optical fibers. If the external diameter of each known optical module is 1.9 mm, the diameter of the optical core is 6.7 and the cable diameter is 8.7 mm. Instead, according to the invention, a same fiber count of 96 may be achieved by using 2 optical modules similar to module 1, each module including 48 optical fibers. If the external diameter of each optical module is 3.1 mm, the diameter of the optical core is 6.2 mm, and the cable diameter is 8.1 mm. Hence, the cable diameter is reduced by 7.3%.

In a known optical cable, a fiber count of 144 may be achieved by using 12 optical modules, each module including 12 optical fibers. If the external diameter of each optical module is 1.9 mm, the diameter of the optical core is 9.2 and the cable diameter is 11.2 mm. Instead, according to the invention, a same fiber count of 144 may be achieved by using 3 optical modules similar to module 1, each module including 48 optical fibers. If the external diameter of each optical module is 3.1 mm, the diameter of the optical core is 6.3 mm, and the cable diameter is 8.3 mm. Hence, the cable diameter is reduced by 25.6%. Hence, a substantial cable diameter reduction is advantageously achieved for all the fiber counts.

Mid-span access to fibers is moreover much easier in the optical module 1 than in wrapped fiber optical modules. The optical fibers 15 arranged within the annular space 13 may be indeed easily accessed by simply cutting the outer retaining element 12. The optical fibers 14 arranged within the inner retaining element 11 are also easily accessible, by moving aside the fibers 15 arranged within the annular space 13 (which may be easily done, especially if these fibers are arranged side by side with no reciprocal overlapping on a single circumference) and removing the inner retaining element 11.

The optical module 1 can be manufactured in an easy and cost effective way. In particular, the optical module as described above may be manufactured using a cable making equipment with few modifications, as it will be described in detail hereinafter with reference to FIG. 5.

The optical modules according to embodiments of the present invention may be advantageously used in several cable constructions, as it will be described in detail herein after with reference to FIGS. 2 to 4.

Figure 2:
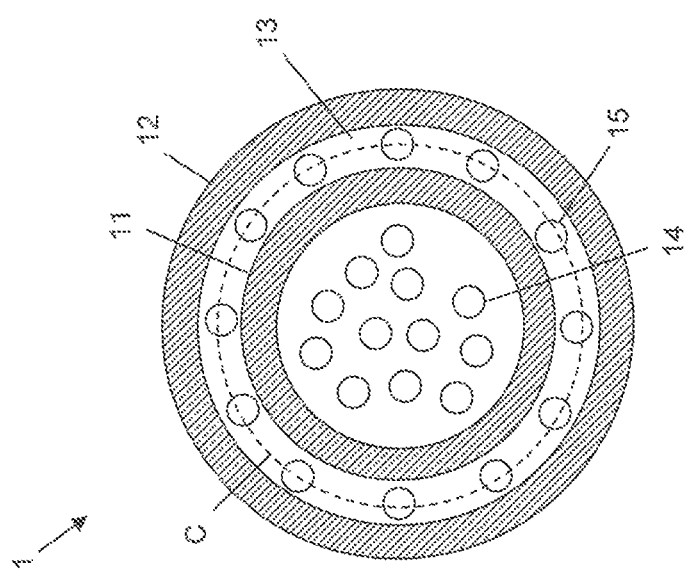
FIG. 2 shows a CLT cable comprising an optical module according to an embodiment of the present invention.

By way of example, FIG. 2 shows a CLT (Central Loose Tube) cable 2 comprising the optical module 1 shown in FIG. 1. The retaining elements of the optical module 1 are preferably in the form of tubes made of a relatively rigid material. In addition to the optical module 1, the CLT cable 2 comprises a layer of aramid yarns 21 arranged externally to the outer retaining element 12 of the optical module 1. The CLT cable 2 also preferably comprises an outer sheath 22 arranged externally to the layer of aramid yarns 21. The outer sheath 22 is preferably made of a low smoke zero halogen material (e.g. AlphaGary Megolon™ S540ENS, Prysmian LSOHTMor Borealis Casico™ FR4803). Optionally, side strength elements (e.g. steel members) may be embedded within the thickness of outer sheath 22.

Though the optical module 1 comprised within the CLT cable 2 shown in FIG. 2 comprises two coaxial retaining elements only, a CLT cable may be indeed obtained using optical modules that, according to other embodiments of the present invention, comprise more than two coaxial retaining elements, as discussed above.

Since, as discussed above, the optical module 1 has a reduced diameter in comparison to e.g. bundled fibers optical modules comprising a same number of uniquely identifiable optical fibers, also the CLT cable 2 shown in FIG. 2 has a reduced diameter in comparison to CLT cables comprising wrapped fiber optical modules. This is advantageous, especially when the CLT cable is used for FTTX applications, e.g. when the CLT cable 2 is used as a drop cable. The external diameter of a CLT cable comprising bundled fibers optical modules and having a fiber count of 48 is indeed typically of 5.0 mm. By using the optical module 1, instead, a CLT cable with a same fiber count may be obtained, whose diameter is 4.45 mm.

Figure 3:
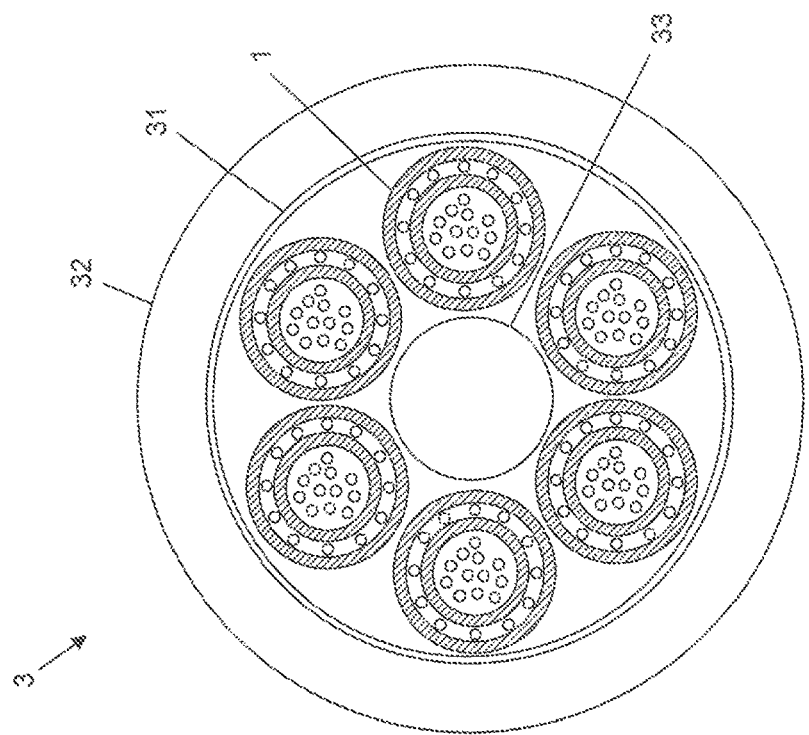
FIG. 3 shows a MLT cable comprising optical modules according to an embodiment of the present invention.

FIG. 3 shows a MLT (Multi Loose Tube) cable 3 comprising a plurality of optical modules similar to the optical module 1 shown in FIG. 1. The MLT cable construction typically allows providing cables with increased fiber count, in comparison to the CLT cable shown in FIG. 2.

By way of example, the MLT cable 3 shown in FIG. 3 comprises six optical modules 1. Each optical module 1 has a structure similar to that shown in FIG. 1 and described above. Hence, a detailed description will not be repeated. The MLT cable 3 has accordingly a fiber count of 24×6=144. The retaining elements of the optical modules 1 are preferably in the form of rigid tubes. The optical modules 1 are preferably arranged according to an open helix (or "S-Z") lay about the longitudinal axis of the cable 3.

In order to allow identification of each single fiber of the cable 3, the outer retaining element of each optical module 1 comprised within the MLT cable 3 has a respective color. Hence, each single optical fiber of the cable 3 is preferably identified by a combination of:
   color of the outer retaining element of the optical module 1 in which the fiber is comprised;
   position of the fiber within the optical module (namely, in the annular space 13 or within the inner retaining element 11); and
   fiber color as defined e.g. by the above mentioned international standard ANSI/EIA/TIA-598 "Optical Fiber Color Coding".

In addition to the optical modules 1, the MLT cable 3 preferably comprises a binder 31 surrounding the optical modules 1. The binder 31 preferably comprises a wrapping tape (e.g. an EFFEGIDI International Cavilen 19 micron polyester tape, bond with Roblon low shrink polyester 1670 dtex water swelling binders). The MLT cable 3 also preferably comprises an outer sheath 32 arranged externally to the binder 31. The outer sheath 32 is preferably made of a high density polyethylene (e.g. Bi modal high density polyethylene Borealis Borstar® HE6062). The MLT cable 3 also preferably comprises a central strength member 33, about which the optical modules 1 are helically wound as described above. Optionally, side strength elements (e.g. steel members) may be embedded within the thickness of outer sheath 32.

Though the optical modules 1 comprised within the MLT cable 3 shown in FIG. 3 comprise two coaxial retaining elements only, this is not limiting. An MLT cable may be indeed obtained using optical modules that, according to other embodiments of the present invention, comprise more than two coaxial retaining elements, as discussed above.

Since, as discussed above, the optical modules 1 have a reduced diameter in comparison to e.g. bundled fiber optical modules comprising a same number of uniquely identifiable optical fibers, also the MLT cable 3 shown in FIG. 3 has a reduced diameter in comparison to MLT cables comprising bundled fiber optical modules. This is advantageous, especially when the MLT cable is used for FTTX applications. The inventors have estimated that a cable diameter reduction of 20%-45% may be achieved in MLT cables, depending on their geometry and their fiber count. Some examples for some specific MLT designs are provided herein after.

As a first example, an MLT cable with fiber count of 288 is provided, which includes 24 known optical modules, each module including 12 optical fibers. If the external diameter of each optical module is 1.9 mm and the optical modules are arranged in two coaxial layers (9 optical modules forming a first, inner layer around the central strength member and 15 optical modules forming a second, outermost layer), the diameter of the optical core is 11.8 mm. According to the invention, an MLT cable with the same fiber count of 288 may be provided instead by using only 6 optical modules similar to module 1, each module including 48 optical fibers coaxially arranged as described above. If the external diameter of each optical module is 3.1 mm and all the 6 optical modules are arranged in a single layer about the central strength member, the diameter of the optical core is 9.3 mm. Hence, the diameter of the optical core is advantageously reduced by 21.2% (and a corresponding reduction is achieved on the whole MLT cable diameter).

As a second example, an MLT cable with fiber count of 432 is provided, which includes 36 known optical modules, each module including 12 optical fibers. If the external diameter of each optical module is 2.5 mm (a larger diameter being needed in order to ensure an adequate large central strength member, in view of the higher fiber count of the cable) and the known optical modules are arranged in two coaxial layers (15 optical modules forming a first, inner layer around the central strength member and 21 optical modules forming a second, outermost layer), the diameter of the optical core is 21.2 mm (with a tolerance of +/−0.6 mm). According to the invention, an MLT cable with the same fiber count of 432 may be provided instead by using only 9 optical modules similar to module 1, each module including 48 optical fibers coaxially arranged as described above. If the external diameter of each optical module is 3.1 mm and all the 9 optical modules are arranged in a single layer about the central strength member, the diameter of the optical core is 12.6 mm. Hence, the diameter of the optical core is advantageously reduced by 40.3% (and a corresponding reduction is achieved on the whole cable diameter).

Figure 4:
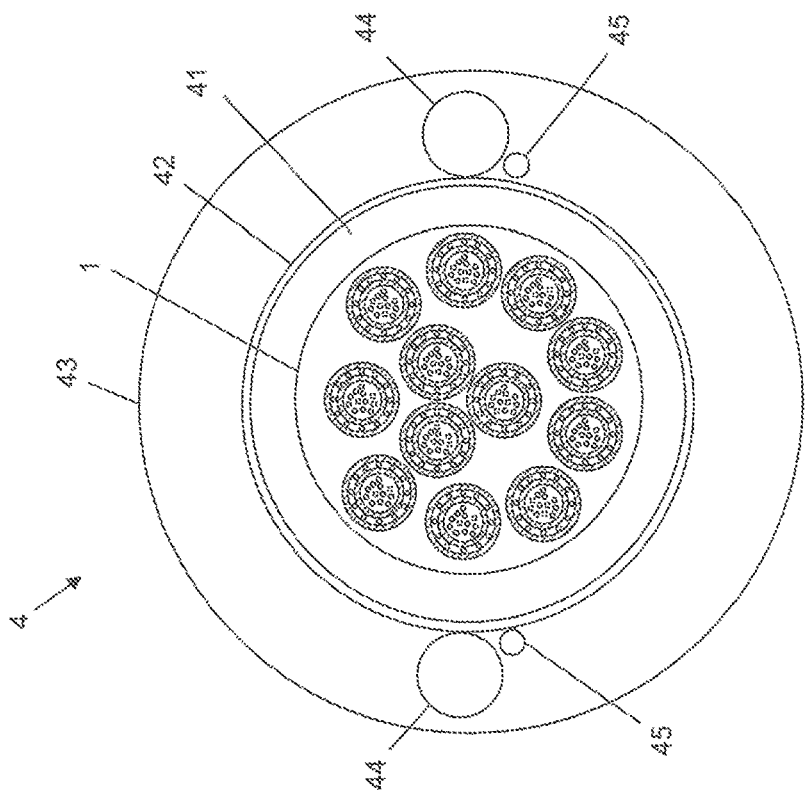
FIG. 4 shows a micro-module cable comprising optical modules according to an embodiment of the present invention.

FIG. 4 shows a micro-module cable 4 comprising a plurality of optical modules similar to the optical module 1 shown in FIG. 1. A micro-module cable construction typically allows further increasing the fiber count (and/or reducing the cable diameter), in comparison to the MLT cable shown in FIG. 3.

By way of example, the micro-module cable 4 shown in FIG. 4 comprises twelve optical modules 1. Each optical modules 1 has a structure similar to that shown in FIG. 1 and described above. Hence, a detailed description will not be repeated. The micro-module cable 4 has accordingly a fiber count of 24×12=288. The retaining elements of the optical modules 1 are preferably in the form of non-rigid tubes (e.g. tubes made of a thermoplastic material). The optical modules 1 are preferably arranged according to an open helix (or "S-Z") pattern about the longitudinal axis of the cable 4.

In order to allow identification of each single fiber of the cable 4, the outer retaining element of each optical module 1 comprised within the micro-module cable 4 has a respective color. Hence, each single optical fiber of the cable is preferably identified by a combination of:
   color of the outer retaining element of the optical module 1 in which the fiber is comprised;
   position of the fiber within the optical module (namely, in the annular space 13 or within the inner retaining element 11); and
   fiber color as defined e.g. by the above mentioned international standard ANSI/EIA/TIA-598 "Optical Fiber Color Coding".

In addition to the optical modules 1, the micro-module cable 4 preferably comprises an inner tube 41 surrounding the optical modules 1. The inner tube 41 is preferably made of a polyethylene (e.g. Bi modal high density polyethylene Borealis Borstar® HE6062 or low shrink Borealis Borstar® HE6068). The cable 4 also preferably comprises a binder 42 surrounding the inner tube 41. The binder 42 preferably comprises a wrapping tape. The micro-module cable 4 also preferably comprises an outer sheath 43 arranged externally to the binder 42. The outer sheath 43 is preferably made of high density polyethylene (e.g. high density polyethylene *Borealis* Borstar® HE6062). The micro-module cable 4 also preferably comprises side strength elements (e.g. steel members) 44 embedded within the thickness of outer sheath 43. Ripcords 45 are also preferably embedded within the thickness of the outer sheath 43.

Though the optical modules 1 comprised within the micro-module cable 4 shown in FIG. 4 comprise two coaxial retaining elements only, this is not limiting. A micro-module cable may be indeed obtained using optical modules that, according to other embodiments of the present invention, comprise more than two coaxial retaining elements, as discussed above.

Since, as discussed above, the optical modules 1 have a reduced diameter in comparison to e.g. wrapped fiber optical modules comprising a same number of uniquely identifiable optical fibers, also the micro-module cable 4 shown in FIG. 4 has a reduced diameter in comparison to micro-module cables comprising wrapped fiber optical modules. The cable diameter reduction is comparable to that achievable for CLT cables (see above). This is advantageous, especially when the micro-module cable is used for FTTX applications.

Though in the present description only CLT cables, MLT cables and micro-module cables have been described, the optical modules according to embodiments of the present invention may be applied to any known cable construction, whenever one wishes to increase the cable fiber count while preserving the identifiability of each single fiber without using a wrapped group design (that, as discussed above, entails several drawbacks).

Figure 5:
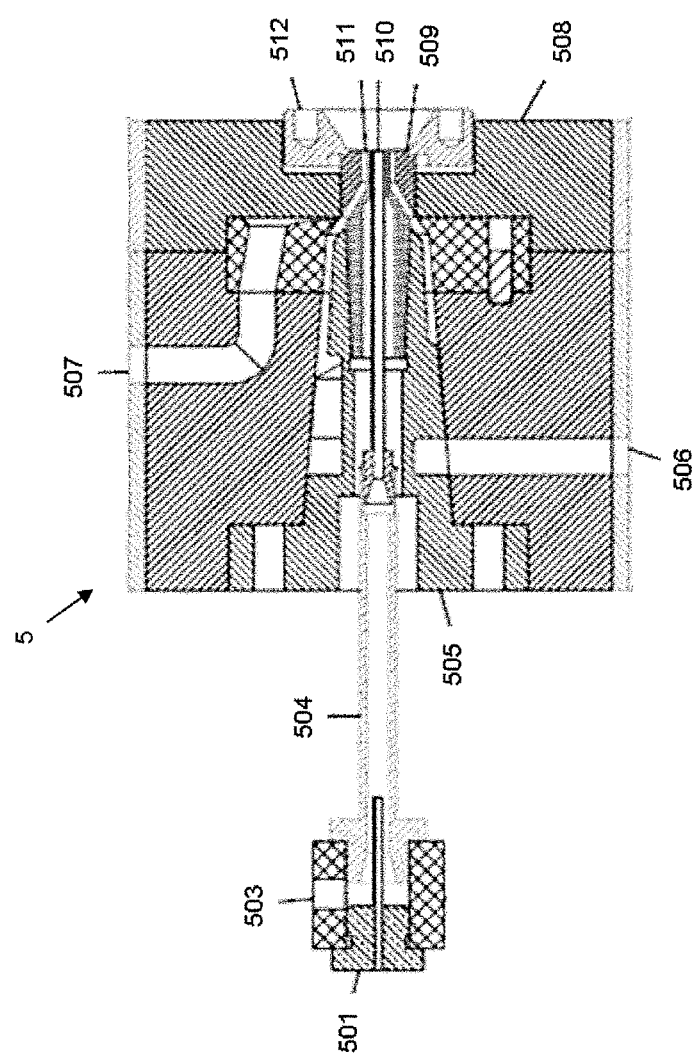
FIG. 5 schematically shows an equipment for manufacturing an optical module according to an embodiment of the present invention.

With reference to FIG. 5, an apparatus and process for manufacturing the optical module 1 according to an embodiment of the present invention will be described in detail.

The apparatus comprises a first stage and a second stage cascaded thereto.

The first stage (not shown in FIG. 5) is configured to manufacture the inner retaining element 11 with fibers 14. The first stage may be a commercial available extrusion line suitable for manufacturing a standard single layer tube. The inventors have made positive tests by using a 4/6 Optical Fiber Extrusion Crosshead by Nextrom (Finland).

The second stage is configured to provide outer layer 12 and fibers 15 onto the inner retaining element 11 with fibers 14 provided by the first stage.

In particular, the second stage preferably comprises a fiber guide 501, a grease port 503, a grease body 504, a cartridge 505, a primary extruder port 506, an auxiliary extruder port 507 (optional), an extruder head die body 508, a die 509, a grease tip 510, a core tube 511 and a die nut 512. The fiber guide 501 is preferably configured to support the fibers 14 to be incorporated in the annular space 13. The grease port 503 is preferably the inlet of the grease that will fill the annular space 13. The grease body 504 is preferably configured to support the grease tip 510 in its correct position, the grease tip 510 being in turn configured to supply the grease that will fill the annular space 13. The cartridge (or "flow tube") 505 is preferably configured to hold the core tube 511 in its correct position while allowing the polymer provided by the primary extruder port 506 flowing along the head into the void between the core tube 511 and die 509. The primary extruder port 506 is preferably configured to supply the polymer forming the outer retaining element 12 to the core tube 511. The auxiliary extruder port 507 is preferably configured to supply a further polymer (optional) to the core tube 511 (e.g. for forming a colored strip along the outer retaining element 12 or for improving the extrusion properties). The extruder head die body 508 is preferably configured to support die 509 and die nut 512. The die 509 (preferably retained by the die nut 512) and core tube 511 are preferably configured to define an annular void space through which the extruded polymer flows thereby forming the outer retaining element 12.

Advantageously, the second stage of the apparatus 5 may be a commercial available extrusion line, with some modifications, as hereinafter described. The inventors have made positive tests using a modified 4/6 Optical Fiber Extrusion Crosshead by Nextrom (Finland). A modification includes providing the fiber guide 501 with a continuous small bore guide, which ensures that fibers 15 are bundled about the inner retaining element 11 over the whole length of the fiber guide 501. Such bore guide preferably has an inside diameter of about 2.7 mm and an outside diameter of about 3.5 mm. Furthermore, as to the grease tip 510, its internal diameter preferably approximates the final required injected package of 2.7 mm (the internal diameter of the grease tip 502 is instead usually slightly larger—about 20%—than the internal diameter of the fiber guide 501, in order to ensure forward flow of the grease).

The process for manufacturing the optical module 1 by using the apparatus 5 will be now described in detail.

Firstly, the first stage of the apparatus 5 extrudes the inner retaining element 11 about the optical fibers 14, and fills the interstitial spaces amongst the fibers 14 with the filling compound.

Then, the inner retaining element 11 with the optical fibers 14 (and the filling compound) therein is fed to the second stage of the apparatus 5.

According to a first embodiment, the process for manufacturing the optical module 1 is a continuous process or a single-step process, namely the inner retaining element 11 with the optical fibers 14 is continuously fed to the second stage of the apparatus 5 as it is output by the first stage of the apparatus 5.

According to a second embodiment, the process for manufacturing the optical module 1 is a two-step process, namely it is interrupted upon manufacturing of the inner retaining element 11 with the optical fibers 14. The inner retaining element 11 with the optical fibers 14 as output by the first stage of the apparatus 5 is coiled and stored, and then fed to the second stage of the apparatus 5 at a later time.

In both cases (single-step and two-step process), within the apparatus 5 the inner retaining element 11 with the optical fibers 14 is firstly passed through the fiber guide 501. The optical fibers 15 to be incorporated in the annular space 13 that will be formed between the retaining elements 11, 12 are preferably oscillated about the inner retaining element 11 and are gathered at the fiber guide 501. Then, the retaining element 11 (with fibers 14 arranged therein and fibers 15 arranged about it) is passed though the grease tip 510, which injects the filling compound in the interstitial spaces amongst the fibers 15. The collection of inner retaining element 11, fibers 15 and filling compound is then fed to the extruding tool comprising core tube 511 and die 509, which extrude the outer retaining element 13 upon the fibers 15.

The process for manufacturing the optical module 1 is advantageously very simple, and may be carried out by a commercial available extrusion line with few modifications.

The optical module can be used as such, as a finished cable, when the intended operating conditions allow to do so, or completed with one or more strength members and an outer sheath. Alternatively, a plurality of modules can be arranged together, in a multi-module cable construction, when a high fiber count cable is required.

The optical module of the invention advantageously has several advantages. It has a reduced diameter, in comparison to known optical modules comprising a same number of uniquely identifiable optical fibers, since the coaxial arrangement of the optical fibers within the optical module is very compact. This allows providing cables with an increased fiber density. The mid-span access to fibers is much easier than in bundled fiber optical modules.

The invention claimed is:

1. An optical cable comprising an optical module comprising:
   a first group of optical fibers;
   a first retaining element arranged about said first group of optical fibers, wherein the first group of optical fibers is loosely arranged within the first retaining element;
   a second group of optical fibers arranged about said first retaining element, said second group of optical fibers being arranged substantially on a single circumference concentric with said first retaining element; and
   a second retaining element arranged about said second group of optical fibers, said second retaining element being substantially coaxial with said first retaining element,
   (a) wherein the second group of optical fibers is an array of optical fibers arranged substantially on the single circumference side by side, with no reciprocal overlapping; and
   (b) wherein the second group of optical fibers are arranged within an annular space formed between the first retaining element and the second retaining element according to an S-Z arrangement.

2. The optical cable according to claim 1, wherein said first retaining element and said second retaining element are two coaxial tubes.

3. The optical cable according to claim 2, wherein said two coaxial tubes are made of a same polymeric material.

4. The optical cable according to claim 2, wherein said two coaxial tubes are made of different polymeric materials.

5. The optical cable according to claim 1, wherein at least one of said first retaining element and said second retaining element comprises a longitudinal or helical tape or yarns.

6. The optical cable according to claim 1, wherein said first retaining element is a longitudinal or helical tape or yarns, and said second retaining element is a coaxial tube.

7. The optical cable according to claim 1, said first retaining element and said second retaining element have different colors.

8. The optical cable according to claim 1, wherein said second group of optical fibers is loosely arranged within an annular space defined between said first retaining element and said second retaining element.

9. The optical cable according to claim 1, wherein at least one of said first group of optical fibers and said second group of optical fibers comprises a number of fibers such that each one of said at least one of said first group of optical fibers and said second group of optical fibers is uniquely identifiable based on the color thereof.

10. The optical cable according to claim 1, wherein at least some free volume within said first retaining element and/or within said second retaining element is filled with a filling compound.

11. A process for manufacturing an optical module of an optical cable, comprising:
    advancing a first group of optical fibers;
    laying a first retaining element about said first group of optical fibers, wherein said first group of optical fibers is laid loosely within said first retaining element;
    laying a second group of optical fibers about said first retaining element; and
    laying a second retaining element about said second group of optical fibers, said second retaining element being substantially coaxial with said first retaining element,
    (a) wherein the second group of optical fibers is laid substantially on a single circumference side by side, with no reciprocal overlapping; and
    (b) the second group of optical fibers is laid within an annular space formed between the first retaining element and the second retaining element according to an S-Z arrangement.

12. The process according to claim 11, wherein said second group of optical fibers is laid in a single layer, coaxial with said first retaining element.

13. The process according to claim 11, wherein laying at least one of the first retaining element and second retaining element is by extrusion.

* * * * *